(12) United States Patent
Epler

(10) Patent No.: US 11,130,423 B2
(45) Date of Patent: Sep. 28, 2021

(54) BATTERY SYSTEM HAVING MULTIPLE ACCUMULATOR APPARATUS FOR A BATTERY-OPERATED ELECTRIC VEHICLE AND METHOD FOR UTILIZING A REMAINING RANGE OF SAME

(71) Applicant: Dr. Ing. h.c. F. Porsche Aktiengesellschaft, Stuttgart (DE)

(72) Inventor: Eike Epler, Stuttgart (DE)

(73) Assignee: Dr. Ing. h.c. F. Porsche Aktiengesellschaft (DE)

( * ) Notice: Subject to any disclaimer, the term of this patent is extended or adjusted under 35 U.S.C. 154(b) by 56 days.

(21) Appl. No.: 16/262,071

(22) Filed: Jan. 30, 2019

(65) Prior Publication Data

US 2019/0232814 A1    Aug. 1, 2019

(30) Foreign Application Priority Data

Feb. 1, 2018  (DE) .......................... 102018102211.5

(51) Int. Cl.
*H01M 10/42* (2006.01)
*B60L 58/12* (2019.01)
*B60L 58/18* (2019.01)

(52) U.S. Cl.
CPC .............. *B60L 58/12* (2019.02); *B60L 58/18* (2019.02); *H01M 10/425* (2013.01); *H01M 2010/4271* (2013.01); *H01M 2220/20* (2013.01)

(58) Field of Classification Search
CPC ............. H01M 10/425; H01M 10/482; H01M 10/441; B60L 58/12; B60L 58/18
(Continued)

(56) References Cited

U.S. PATENT DOCUMENTS 4,274,043 A * 6/1981 Heitz ...................... H02M 3/07
                                                              320/117
4,689,531 A * 8/1987 Bacon ..................... B60L 50/62
                                                              318/139
(Continued)

FOREIGN PATENT DOCUMENTS

JP    2010206933 A    9/2010
JP    2011097771 A    5/2011
(Continued)

OTHER PUBLICATIONS

Notification of Reason for Rejection for Japanese Application No. 2019-014031, dated Mar. 24, 2020, 6 pages.
(Continued)

*Primary Examiner* — John T Trischler
(74) *Attorney, Agent, or Firm* — RatnerPrestia

(57) ABSTRACT

A method and a device includes a first accumulator apparatus and a second accumulator apparatus. The device includes a control apparatus that is configured so as, depending on a first state of charge of the first accumulator apparatus and/or on a second state of charge of the second accumulator apparatus, to selectively either operate the first accumulator apparatus and the second accumulator apparatus in a series connection between a first terminal and a second terminal in order to supply power to a vehicle at a first supply voltage, or, in order to supply power to a vehicle by way of the second accumulator apparatus at a second supply voltage, to electrically disconnect the first accumulator apparatus from the first terminal and/or from the second terminal.

9 Claims, 2 Drawing Sheets

(58) Field of Classification Search
USPC .......................................................... 320/138
See application file for complete search history.

(56) References Cited

U.S. PATENT DOCUMENTS

| | | | | |
|---|---|---|---|---|
| 6,158,541 | A * | 12/2000 | Tabata | B60K 6/48 180/165 |
| 6,919,707 | B2 * | 7/2005 | Kawai | H01M 10/441 320/117 |
| 7,830,126 | B2 * | 11/2010 | Kawahara | B60L 58/22 320/160 |
| 7,893,562 | B2 * | 2/2011 | Oga | H02M 1/10 307/71 |
| 7,933,694 | B2 * | 4/2011 | Kato | B60W 20/13 701/22 |
| 8,030,880 | B2 * | 10/2011 | Alston | B60H 1/00428 320/103 |
| 8,358,032 | B2 * | 1/2013 | Oga | H02J 7/0063 307/71 |
| 8,364,388 | B2 * | 1/2013 | Naito | B60L 58/20 701/439 |
| 8,532,854 | B2 * | 9/2013 | Tate, Jr. | B60L 58/12 701/22 |
| 8,538,616 | B2 * | 9/2013 | Yamamoto | B60W 10/26 701/22 |
| 8,571,733 | B2 * | 10/2013 | Yamamoto | B60L 58/21 701/22 |
| 8,639,406 | B2 * | 1/2014 | Avery | B60L 58/20 701/22 |
| 8,816,613 | B2 * | 8/2014 | Lee | B60L 58/19 318/140 |
| 8,863,540 | B2 * | 10/2014 | Alston | B60H 1/3232 62/236 |
| 8,896,155 | B2 * | 11/2014 | Oga | H02M 1/10 307/71 |
| 8,957,610 | B2 * | 2/2015 | Lee | B60L 58/21 318/139 |
| 9,172,254 | B2 * | 10/2015 | Ganor | H01M 10/0445 |
| 9,276,406 | B2 * | 3/2016 | Sato | H02H 11/007 |
| 9,537,331 | B2 * | 1/2017 | Kim | H02J 7/0016 |
| 9,676,278 | B2 * | 6/2017 | Mueller | B60L 3/0061 |
| 9,889,751 | B2 * | 2/2018 | Jang | B60L 3/0046 |
| 9,932,029 | B2 * | 4/2018 | Pruitt | B60L 15/20 |
| 9,960,458 | B2 * | 5/2018 | Weicker | H02J 7/1423 |
| 9,975,447 | B2 * | 5/2018 | Tokushige | B60L 11/1872 |
| 9,979,209 | B2 * | 5/2018 | Wolff | H01M 10/441 |
| 10,179,519 | B2 * | 1/2019 | Schmidt | B60L 58/21 |
| 10,189,469 | B2 * | 1/2019 | Atluri | B60W 20/20 |
| 10,193,356 | B2 * | 1/2019 | Butzmann | H02J 7/0014 |
| 10,193,359 | B2 * | 1/2019 | Ganor | H02J 7/00 |
| 10,250,044 | B2 * | 4/2019 | Schindler | H02J 7/1423 |
| 10,355,320 | B2 * | 7/2019 | Fujita | H01M 10/482 |
| 10,427,547 | B2 * | 10/2019 | Syouda | B60L 53/62 |
| 10,630,101 | B2 * | 4/2020 | Hsieh | H02J 7/0019 |
| 10,741,885 | B2 * | 8/2020 | Zacher | H02J 7/0024 |
| 10,756,548 | B2 * | 8/2020 | Syouda | H02J 7/0019 |
| 10,833,523 | B2 * | 11/2020 | Hikosaka | H02J 7/0019 |
| 10,971,941 | B2 * | 4/2021 | Krieg | H02J 7/0024 |
| 2003/0129457 | A1 | 7/2003 | Kawai et al. | |
| 2006/0058897 | A1 * | 3/2006 | Senda | F02N 11/0866 700/22 |
| 2006/0075266 | A1 * | 4/2006 | Popescu-Stanesti | H02J 7/0027 713/300 |
| 2007/0247106 | A1 | 10/2007 | Kawahara et al. | |
| 2009/0072625 | A1 * | 3/2009 | Oga | H02M 3/158 307/80 |
| 2009/0107743 | A1 * | 4/2009 | Alston | H02J 7/342 180/65.21 |
| 2009/0160247 | A1 * | 6/2009 | Nakamura | B60L 15/007 307/9.1 |
| 2009/0229288 | A1 * | 9/2009 | Alston | F25B 27/00 62/236 |
| 2010/0100264 | A1 * | 4/2010 | Kato | B60K 6/445 701/22 |
| 2010/0106401 | A1 * | 4/2010 | Naito | G01C 21/3679 701/533 |
| 2011/0109166 | A1 * | 5/2011 | Oga | H02J 7/0069 307/80 |
| 2011/0115298 | A1 * | 5/2011 | Oga | H02M 3/158 307/77 |
| 2011/0178664 | A1 * | 7/2011 | Yamamoto | B60K 6/445 701/22 |
| 2011/0251745 | A1 * | 10/2011 | Yamamoto | B60W 20/13 701/22 |
| 2012/0038314 | A1 * | 2/2012 | Stewart | B60L 1/02 320/103 |
| 2012/0041624 | A1 * | 2/2012 | Stewart | B60L 58/26 701/22 |
| 2012/0083948 | A1 * | 4/2012 | Tate, Jr. | B60L 58/12 701/22 |
| 2012/0256568 | A1 * | 10/2012 | Lee | B60L 15/007 318/139 |
| 2012/0274140 | A1 * | 11/2012 | Ganor | H01M 10/4207 307/71 |
| 2012/0323421 | A1 * | 12/2012 | Avery | B60W 10/26 701/22 |
| 2012/0326654 | A1 * | 12/2012 | Ito | B60L 53/53 320/103 |
| 2012/0330486 | A1 * | 12/2012 | Jingu | B60L 50/62 701/22 |
| 2013/0106357 | A1 * | 5/2013 | Girard | B60L 58/21 320/126 |
| 2013/0181511 | A1 * | 7/2013 | Stewart | B60L 3/0061 307/9.1 |
| 2013/0187591 | A1 * | 7/2013 | Stewart | B60L 50/51 320/104 |
| 2013/0300192 | A1 * | 11/2013 | Inaba | B60L 3/0046 307/9.1 |
| 2013/0300370 | A1 * | 11/2013 | Hotta | H01M 10/482 320/117 |
| 2014/0285003 | A1 * | 9/2014 | Mueller | B60L 15/20 307/10.1 |
| 2015/0249351 | A1 | 9/2015 | Wolff et al. | |
| 2015/0364797 | A1 * | 12/2015 | Inaba | H01M 10/425 429/61 |
| 2015/0367836 | A1 * | 12/2015 | Pruitt | B60L 1/003 701/22 |
| 2016/0046195 | A1 * | 2/2016 | Jang | B60L 53/00 320/103 |
| 2016/0075254 | A1 * | 3/2016 | Chang | H02J 7/0024 307/10.7 |
| 2016/0137092 | A1 * | 5/2016 | Thieme | B60K 6/48 307/10.6 |
| 2016/0318418 | A1 * | 11/2016 | Tokushige | H01M 10/443 |
| 2016/0329725 | A1 * | 11/2016 | Butzmann | H02J 7/007 |
| 2016/0380315 | A1 * | 12/2016 | Weicker | H02J 1/10 320/136 |
| 2017/0141589 | A1 * | 5/2017 | Inoue | H02P 1/00 |
| 2017/0182910 | A1 * | 6/2017 | Schmidt | B60L 3/04 |
| 2017/0197520 | A1 * | 7/2017 | Schindler | B60L 58/19 |
| 2017/0201102 | A1 * | 7/2017 | Hikosaka | H02J 7/02 |
| 2017/0257052 | A1 * | 9/2017 | Yamamoto | B60K 6/46 |
| 2017/0282742 | A1 * | 10/2017 | Takizawa | H01M 2/1077 |
| 2017/0285109 | A1 * | 10/2017 | Kawamura | H02J 7/1423 |
| 2017/0292990 | A1 * | 10/2017 | Kawamura | G01R 31/382 |
| 2018/0029588 | A1 * | 2/2018 | Naidu | B60L 50/64 |
| 2018/0056798 | A1 * | 3/2018 | Syouda | B60L 53/11 |
| 2018/0062402 | A1 * | 3/2018 | Syouda | H02J 7/0014 |
| 2018/0109122 | A1 * | 4/2018 | Koerner | H02M 3/155 |
| 2018/0145378 | A1 * | 5/2018 | Fujita | H02J 7/0024 |
| 2019/0106011 | A1 * | 4/2019 | Zacher | H02J 7/0027 |
| 2019/0305385 | A1 * | 10/2019 | Tsuchiya | B60L 3/0046 |
| 2019/0356157 | A1 * | 11/2019 | Ohashi | H02J 7/0018 |
| 2020/0028375 | A1 * | 1/2020 | Ono | H02J 7/0013 |
| 2020/0086761 | A1 * | 3/2020 | Hamada | B60L 58/12 |
| 2020/0119566 | A1 * | 4/2020 | Teusch | H02J 7/0026 |

(56) References Cited

U.S. PATENT DOCUMENTS

2020/0274370 A1* 8/2020 Krieg .................... H02J 7/0024
2020/0290480 A1* 9/2020 Tsubaki ................. B60L 58/21

FOREIGN PATENT DOCUMENTS

| JP | 2015125880 A | 7/2015 | | |
|----|--------------|--------|---|---|
| KR | 20140140108 A | 12/2014 | | |
| WO | 2012101771 A1 | 8/2012 | | |
| WO | WO-2015161861 A1 * | 10/2015 | .............. | B60L 58/12 |

OTHER PUBLICATIONS

Korean Office Action for Korean Application No. 10-2019-0011239, dated Apr. 29, 2020, 5 pages.

\* cited by examiner

BATTERY SYSTEM HAVING MULTIPLE ACCUMULATOR APPARATUS FOR A BATTERY-OPERATED ELECTRIC VEHICLE AND METHOD FOR UTILIZING A REMAINING RANGE OF SAME

CROSS-REFERENCE TO RELATED APPLICATION

This application claims priority to German Patent Application No. DE 10 2018 102 211.5, filed Feb. 1, 2018, which is incorporated by reference herein in its entirety.

FIELD OF THE INVENTION

The invention relates to a battery system for a battery-operated electric vehicle and a method for operating same.

BACKGROUND OF THE INVENTION

Battery-operated vehicles use accumulators that provide a supply of power for the vehicle, including in particular for propulsion.

US 2003129457, US 2007247106, US 2011178664 and US 2011251745, all of which are incorporated by reference herein, disclose connecting a number of power supply batteries in parallel and disconnecting individual batteries depending on state of charge.

US 2015249351, which is incorporated by reference herein, discloses using a number of units, for example cells, in the battery, the use of the weakest unit being limited.

In a configuration in which all of the units are connected in series, there is the possibility of a state of charge of one of the units being too low and the power withdrawal being limited while there is still a remaining amount of power present in other units.

SUMMARY OF THE INVENTION

In view of the foregoing, it is desirable, in a configuration such as his as well, to provide power for the vehicle. This goal may be achieved by the device and the method described herein.

The device comprises a first accumulator apparatus and a second accumulator apparatus, the device comprising a control apparatus that is configured so as, depending on a first state of charge of the first accumulator apparatus and/or on a second state of charge of the second accumulator apparatus, to selectively either operate the first accumulator apparatus and the second accumulator apparatus in a series connection between a first terminal and a second terminal in order to supply power to a vehicle at a first supply voltage, or, in order to supply power to a vehicle by way of the second accumulator apparatus at a second supply voltage, to electrically disconnect the first accumulator apparatus from the first terminal and/or from the second terminal. Switching between a series connection for driving at a high voltage level and an individual connection for driving at a halved, low voltage level is in particular possible. This enables utilization of potential remaining power in a battery having a heterogeneous state, which is able to utilize the advantages of a series connection at a high voltage level.

The control apparatus is preferably configured to operate the first accumulator apparatus and the second accumulator apparatus in a parallel connection between the first terminal and the second terminal.

The first accumulator apparatus and the second accumulator apparatus preferably comprise the same number of battery cells of one battery cell type. This enables a design in which the battery is divided into two halves. This makes it possible, in the event of shutdown of one battery half, to supply power to the vehicle at a voltage value that is lower by about half.

The device preferably comprises an evaluation apparatus that is configured to evaluate the first state of charge and the second state of charge in order to determine a first remaining amount of power in the first accumulator apparatus and a second remaining amount of power in the second accumulator apparatus, the control apparatus being configured so as, in order to supply power to the vehicle by way of the second accumulator apparatus at the second supply voltage, to electrically disconnect the first accumulator apparatus from the first terminal and/or from the second terminal if the first remaining amount of power is below a first threshold value and the second remaining amount of power is above a predefined second threshold value and/or if the first remaining amount of power is smaller than the second remaining amount of power. This allows timely shutdown of a unit having a low state of charge.

The evaluation apparatus is preferably configured to evaluate the second state of charge in order to determine a remaining range of the vehicle, the control apparatus being configured to provide the supply of power to the vehicle by way of the second accumulator apparatus if the remaining range is above a predefined second threshold value. A destination within the remaining range is thereby made reachable.

The device preferably comprises a first electrical connection between the first terminal and a first positive pole of the first accumulator apparatus, the device comprising a second electrical connection between a first negative pole of the first accumulator apparatus and a second positive pole of the second accumulator apparatus, and the device comprising a third electrical connection between a second negative pole of the second accumulator apparatus and the second terminal, a first switching apparatus for selectively electrically connecting or electrically disconnecting the first negative pole and the second positive pole being arranged in the device, a second switching apparatus for selectively electrically connecting or electrically disconnecting the second positive pole and the first terminal being arranged in the device, and a third switching apparatus for selectively electrically connecting or electrically disconnecting the first negative pole and the second negative pole being arranged in the device. This structure enables switching between a series connection for driving and charging at a first voltage level, for example having a voltage range that contains the value 800 V, a parallel connection for charging at a second voltage level, for example having a voltage range that contains the value 400 V, and an individual connection for utilizing a remaining range at the second voltage level, or for utilizing an individual connection for driving and charging.

A method for operating such a device makes provision that, depending on a first state of charge of the first accumulator apparatus and/or on a second state of charge of the second accumulator apparatus, selectively either the first accumulator apparatus and the second accumulator apparatus is operated in a series connection between a first terminal and a second terminal in order to supply power to a vehicle at a first supply voltage, or, in order to supply power to a vehicle by way of the second accumulator apparatus at a second supply voltage, the first accumulator apparatus is operated in a manner electrically disconnected from the first terminal and/or from the second terminal.

The first accumulator apparatus and the second accumulator apparatus are preferably operated in a parallel connection between the first terminal and the second terminal.

The first state of charge and the second state of charge are preferably evaluated in order to determine a first remaining amount of power in the first accumulator apparatus and a second remaining amount of power in the second accumulator apparatus, the first accumulator apparatus, in order to supply power to the vehicle by way of the second accumulator apparatus at the second supply voltage, being electrically disconnected from the first terminal and/or from the second terminal if the first remaining amount of power is below a first threshold value and the second remaining amount of power is above a predefined second threshold value and/or if the first remaining amount of power is smaller than the second remaining amount of power. This makes it possible to utilize the remaining amount of power from the fuller accumulator apparatus.

The second state of charge is preferably evaluated in order to determine a remaining range of the vehicle, the supply of power to the vehicle being provided by way of the second accumulator apparatus if the remaining range is above a predefined second threshold value. This makes it possible to utilize the second accumulator apparatus to reach a destination within the remaining range.

BRIEF DESCRIPTION OF THE DRAWINGS

Further advantageous refinements emerge from the following description and the drawing. In the drawing.

DETAILED DESCRIPTION OF THE INVENTION

Figure 1:
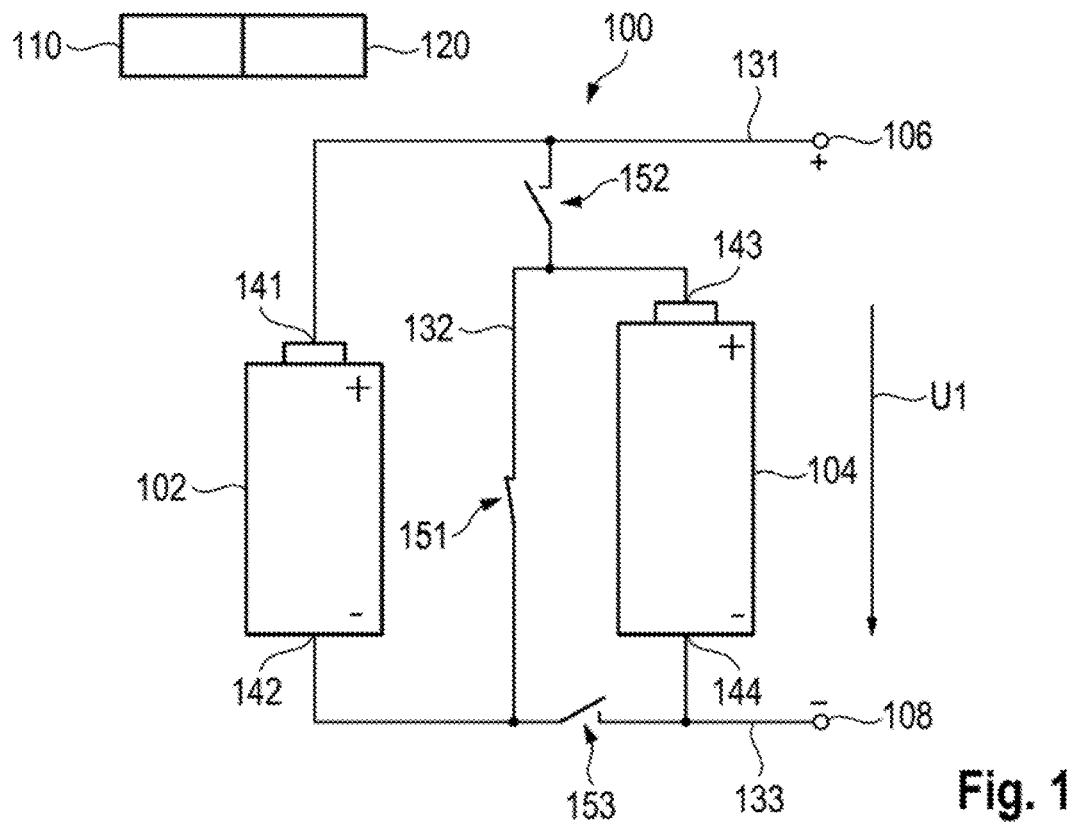
FIG. 1 schematically shows a first operating state of a battery of a vehicle.

FIG. 1 shows a device 100. In the example, the device 100 is a detail from a battery system. The device 100 comprises a first accumulator apparatus 102 and a second accumulator apparatus 104. The first accumulator apparatus 102 and the second accumulator apparatus 104 comprise the same number of battery cells of one battery cell type in the example. The first accumulator apparatus 102 comprises at least one first high-voltage battery unit. The second accumulator apparatus 106 comprises at least one second high-voltage battery unit. These are parts of a battery of a vehicle in the example.

The device 100 comprises a first terminal 106 and a second terminal 108.

The device 100 comprises a control apparatus 110 that is configured so as, depending on a first state of charge of the first accumulator apparatus 102 and/or on a second state of charge of the second accumulator apparatus 104, to selectively either operate the first accumulator apparatus 102 and the second accumulator apparatus 104 in a series connection between the first terminal 106 and the second terminal 108 in order to supply power to a vehicle at a first supply voltage U1, or, in order to supply power to a vehicle by way of the second accumulator apparatus 104 at a second supply voltage U2, to electrically disconnect the first accumulator apparatus 102 from the first terminal 106 and/or from the second terminal 108.

The control apparatus 110 is configured to operate the first accumulator apparatus 102 and the second accumulator apparatus 104, in a charging process for the first accumulator apparatus 102 and the second accumulator apparatus 104, in a parallel connection between the first terminal 106 and the second terminal 108.

The device 100 comprises an evaluation apparatus 120 that is configured to evaluate the first state of charge and the second state of charge in order to determine a first remaining amount of power in the first accumulator apparatus 102 and a second remaining amount of power in the second accumulator apparatus 104, the control apparatus 110 being configured so as, in order to supply power to the vehicle by way of the second accumulator apparatus 104 at the second supply voltage U2, to electrically disconnect the first accumulator apparatus 102 from the first terminal 106 and/or from the second terminal 108 if the first remaining amount of power is below a first threshold value and the second remaining amount of power is above a predefined second threshold value and/or if the first remaining amount of power is smaller than the second remaining amount of power.

The evaluation apparatus 120 is configured to evaluate the second state of charge in order to determine a remaining range of the vehicle, the control apparatus 110 being configured to provide the supply of power to the vehicle by way of the second accumulator apparatus 104 if the remaining range is above a predefined second threshold value.

The device 100 comprises a first electrical connection 131 between the first terminal 106 and a first positive pole 141 of the first accumulator apparatus 102.

The device 100 comprises a second electrical connection 132 between a first negative pole 142 of the first accumulator apparatus 102 and a second positive pole 143 of the second accumulator apparatus 104.

The device 100 comprises a third electrical connection 133 between a second negative pole 144 of the second accumulator apparatus 104 and the second terminal 108.

A first switching apparatus 151 for selectively electrically connecting or electrically disconnecting the first negative pole 142 and the second positive pole 143 is arranged in the device 100.

A second switching apparatus 152 for selectively electrically connecting or electrically disconnecting the second positive pole 143 and the first terminal 106 is arranged in the device 100.

A third switching apparatus 153 for selectively electrically connecting or electrically disconnecting the first negative pole 142 and the second negative pole 144 is arranged in the device 100.

The control apparatus 110 is configured to drive the first switching apparatus 151, the second switching apparatus 152 and the third switching apparatus 153 via switch lines.

A method for operating the device 100 is explained below with reference to FIGS. 1 to 3.

The method for operating the device 100 makes provision that, depending on a first state of charge of the first accumulator apparatus 102 and/or on a second state of charge of the second accumulator apparatus 104, selectively either the first accumulator apparatus 102 and the second accumulator apparatus 104 are operated in the series connection between a first terminal 106 and a second terminal 108 in order to supply power to the vehicle at the first supply voltage U1, or, in order to supply power to the vehicle by way of the second accumulator apparatus 104 at the second supply voltage U2, the first accumulator apparatus 102 is operated in a manner electrically disconnected from the first terminal 106 and/or from the second terminal 108.

FIG. 1 schematically shows a first operating state of the battery for driving and charging in a series connection of the accumulators at the first supply voltage U1, e.g. 800 V. The first switching apparatus 151 is in this case closed, the second switching apparatus 152 is in this case open, and the third switching apparatus 153 is in this case open.

Figure 2:
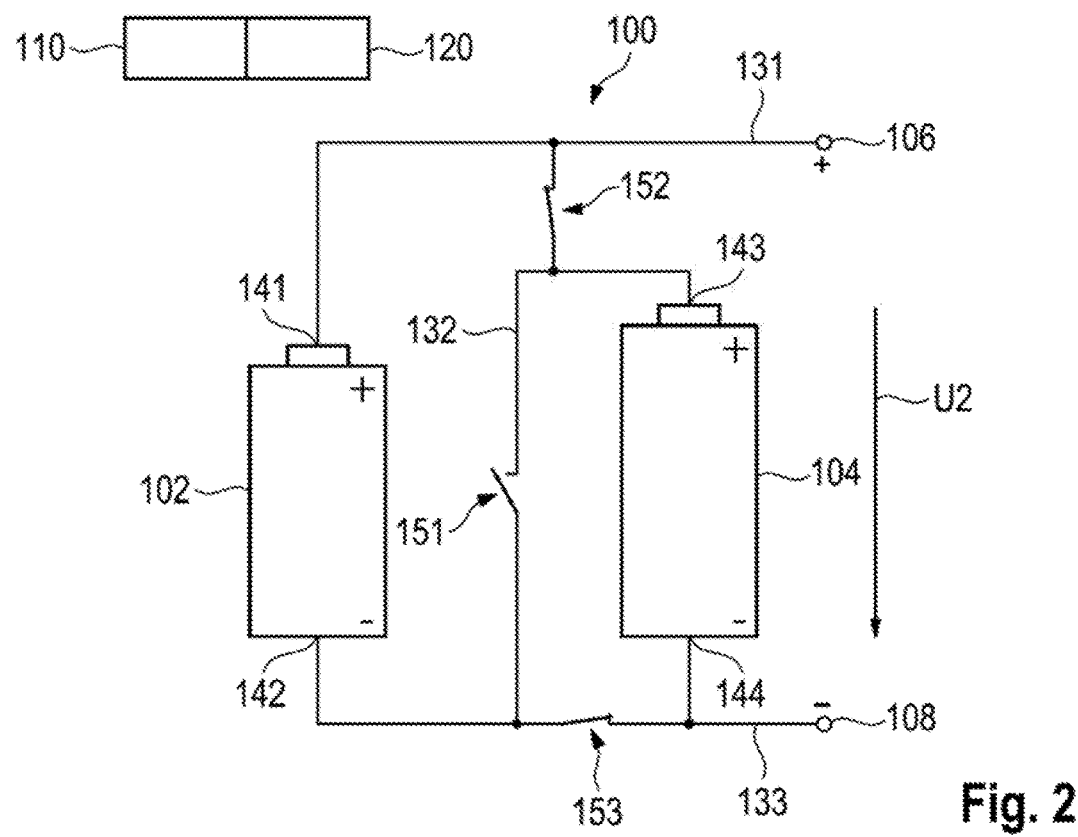
FIG. 2 schematically shows a second operating state of the battery.

FIG. 2 schematically shows a second operating state of the battery in a parallel connection of the accumulators at the second supply voltage U2, e.g. 400 V. The first switching apparatus 151 is in this case open, the second switching apparatus 152 is in this case closed, and the third switching apparatus 153 is in this case closed. The first accumulator apparatus 102 and the second accumulator apparatus 104 are operated, in the charging process for the first accumulator apparatus 102 and the second accumulator apparatus 104, in a parallel connection between the first terminal 105 and the second terminal 108.

Figure 3:
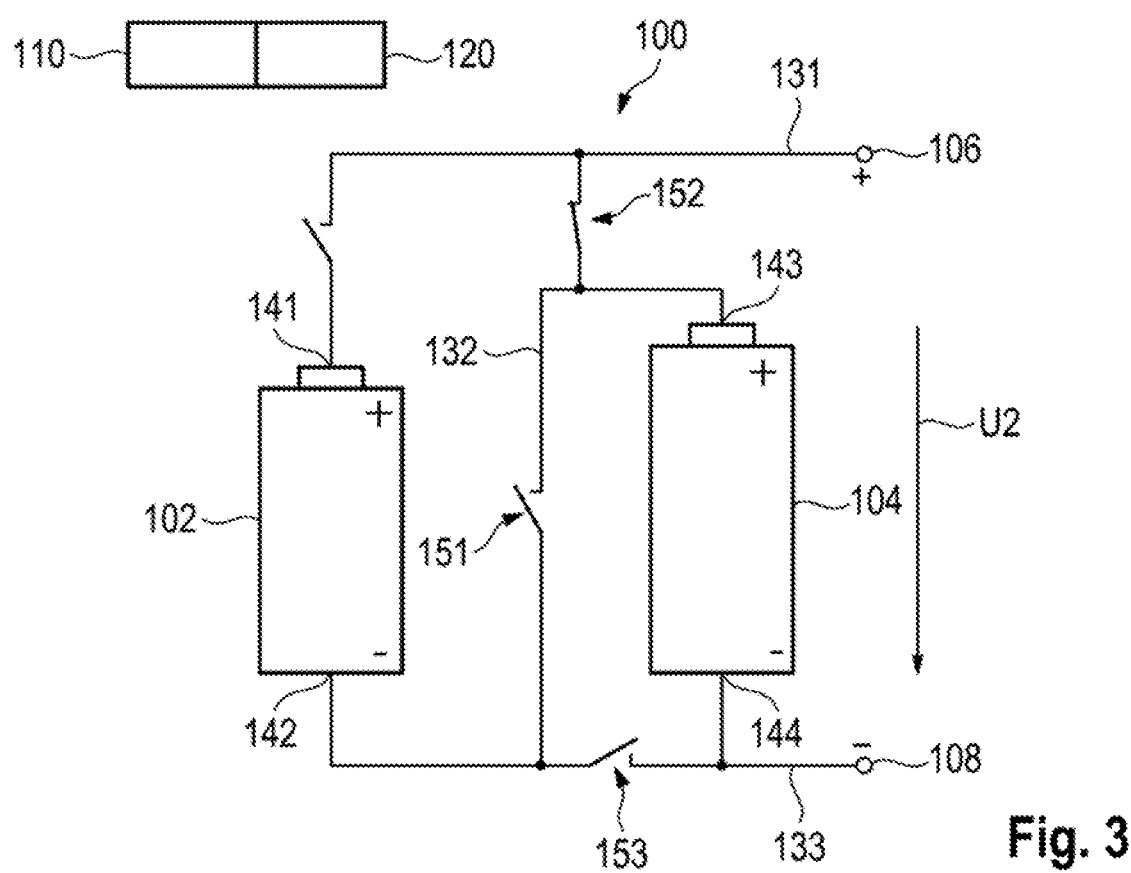
FIG. 3 schematically shows a third operating state of the battery.

FIG. 3 schematically shows a third operating state of the battery for driving at the second supply voltage U2, e.g. 400 V. In this operating state, the first accumulator apparatus 102 is empty, and the second accumulator apparatus 104 has a remaining range. The first switching apparatus 151 is in this case open, the second switching apparatus 152 is in this case closed, and the third switching apparatus 153 is in this case open.

For the switching, the first state of charge and the second state of charge are evaluated in order for example to determine a first remaining amount of power in the first accumulator apparatus 102 and a second remaining amount of power in the second accumulator apparatus 104. The first accumulator apparatus 102, in order to supply power to the vehicle by way of the second accumulator apparatus 104 at the second supply voltage U2, is electrically disconnected from the first terminal 106 and/or from the second terminal 108 if the first remaining amount of power is below a first threshold value and the second remaining amount of power is above a predefined second threshold value and/or if the first remaining amount of power is smaller than the second remaining amount of power.

The second state of charge may be evaluated in order to determine a remaining range of the vehicle, the supply of power to the vehicle being provided by way of the second accumulator apparatus 104 if the remaining range is above a predefined second threshold value.

The first threshold value corresponds for example to a state of charge of 0%. The second threshold value represents for example a state of charge that corresponds to the remaining range.

A battery system having two accumulator apparatuses has been described. The invention is also applicable to any other desired number of accumulator apparatuses.

What is claimed is:

1. A device comprising:
a first accumulator apparatus,
a second accumulator apparatus, and
a control apparatus that is configured so as, depending on a first state of charge of the first accumulator apparatus or depending on a second state of charge of the second accumulator apparatus, to (i) selectively operate the first accumulator apparatus and the second accumulator apparatus in a series connection between a first terminal and a second terminal in order to supply power to a vehicle at a first supply voltage (U1), and, at a different time, (ii) electrically disconnect the first accumulator apparatus from the first terminal, the second terminal, or both the first and second terminals in order to supply power to the vehicle by way of the second accumulator apparatus at a second supply voltage (U2),
wherein the device comprises a first electrical connection between the first terminal and a first positive pole of the first accumulator apparatus, a second electrical connection between a first negative pole of the first accumulator apparatus and a second positive pole of the second accumulator apparatus, and a third electrical connection between a second negative pole of the second accumulator apparatus and the second terminal, and
wherein the device comprises no more than a single first switching apparatus for selectively electrically connecting or electrically disconnecting the first negative pole and the second positive pole, no more than a single second switching apparatus for selectively electrically connecting or electrically disconnecting the second positive pole and the first terminal, and no more than a third single switching apparatus for selectively electrically connecting or electrically disconnecting the first negative pole and the second negative pole.

2. The device as claimed in claim 1, wherein the control apparatus is configured to operate the first accumulator apparatus and the second accumulator apparatus in a parallel connection between the first terminal and the second terminal.

3. The device as claimed in claim 1, wherein the first accumulator apparatus and the second accumulator apparatus comprise a same number of battery cells of one battery cell type.

4. The device as claimed in claim 1, wherein the device comprises an evaluation apparatus that is configured to evaluate the first state of charge and the second state of charge in order to determine a first remaining amount of power in the first accumulator apparatus and a second remaining amount of power in the second accumulator apparatus,
the control apparatus being configured so as, in order to supply power to the vehicle by way of the second accumulator apparatus at the second supply voltage (U2), to electrically disconnect the first accumulator apparatus from the first terminal or from the second terminal if (i) the first remaining amount of power is below a first threshold value and the second remaining amount of power is above a second threshold value, or (ii) the first remaining amount of power is smaller than the second remaining amount of power.

5. The device as claimed in claim 4, wherein the evaluation apparatus is configured to evaluate the second state of charge in order to determine a remaining range of the vehicle, the control apparatus being configured to provide the supply of power to the vehicle by way of the second accumulator apparatus if the remaining range corresponds to a remaining amount of power that is above the second threshold value.

6. A method for operating a device including a first accumulator apparatus, a second accumulator apparatus, and a control apparatus, the method comprising the step of:
depending on a first state of charge of the first accumulator apparatus or depending on a second state of charge of the second accumulator apparatus, the method comprises operating the control apparatus to (i) selectively operate the first accumulator apparatus and the second accumulator apparatus in a series connection between a first terminal and a second terminal in order to supply power to a vehicle at a first supply voltage (U1), and, at a different time, (ii) electrically disconnect the first accumulator apparatus from the first terminal or from the second terminal in order to supply power to the vehicle by way of the second accumulator apparatus at a second supply voltage (U2), wherein the device comprises a first electrical connection between the first terminal and a first positive pole of the first accumulator apparatus, a second electrical connection between a first negative pole of the first accumulator apparatus and a second positive pole of the second accumulator apparatus, and a third electrical connection between a second negative pole of the second accumulator apparatus and the second terminal, and wherein the device comprises no more than a single first switching apparatus for selectively electrically connecting or electrically disconnecting the first negative pole and the second positive pole, no more than a single second switching apparatus for selectively electrically connecting or electrically disconnecting the second positive pole and the first terminal, and no more than a third single switching apparatus for selectively electrically connecting or electrically disconnecting the first negative pole and the second negative pole.

7. The method as claimed in claim 6, further comprising operating the first accumulator apparatus and the second accumulator apparatus in a parallel connection between the first terminal and the second terminal.

8. The method as claimed in claim 6, further comprising evaluating the first state of charge and the second state of charge in order to determine a first remaining amount of power in the first accumulator apparatus and a second remaining amount of power in the second accumulator apparatus, and electrically disconnecting the first accumulator apparatus from the first terminal, the second terminal, or both the first and second terminals, in order to supply power to the vehicle by way of the second accumulator apparatus at the second supply voltage, if (i) the first remaining amount of power is below a first threshold value and the second remaining amount of power is above a predefined second threshold value, or (ii) the first remaining amount of power is smaller than the second remaining amount of power.

9. The method as claimed in claim 8, further comprising evaluating the second state of charge in order to determine a remaining range of the vehicle, the supply of power to the vehicle being provided by way of the second accumulator apparatus if the remaining range is above a predefined second threshold value.

\* \* \* \* \*